(12) United States Patent
Aoki

(10) Patent No.: US 9,256,581 B2
(45) Date of Patent: Feb. 9, 2016

(54) INFORMATION PROCESSING APPARATUS, INFORMATION PROCESSING METHOD, AND STORAGE MEDIUM FOR STORING PROGRAM

(75) Inventor: Nobushige Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 13/568,583

(22) Filed: Aug. 7, 2012

(65) Prior Publication Data

US 2013/0057876 A1 Mar. 7, 2013

(30) Foreign Application Priority Data

Sep. 2, 2011 (JP) ................................. 2011-192032

(51) Int. Cl.
| | | |
|---|---|---|
| G06F 15/00 | (2006.01) |
| G06F 17/22 | (2006.01) |
| G06K 15/02 | (2006.01) |
| G06F 17/21 | (2006.01) |
| G06F 17/24 | (2006.01) |
| G06K 15/00 | (2006.01) |

(52) U.S. Cl.
CPC .......... *G06F 17/2247* (2013.01); *G06F 17/217* (2013.01); *G06F 17/24* (2013.01); *G06K 15/1885* (2013.01)

(58) Field of Classification Search
CPC ..... G06F 17/212; G06F 3/125; G06F 3/1256; G06F 17/2247; G06F 17/217; G06F 17/24; G06K 15/1885; H04N 1/00161; H04N 1/00167
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| | | | |
|---|---|---|---|
| 2005/0216836 A1* | 9/2005 | Duke et al. ..................... 715/531 |
| 2006/0023247 A1* | 2/2006 | Yamakawa .................... 358/1.14 |
| 2008/0178117 A1* | 7/2008 | Gelman et al. ................ 715/808 |
| 2010/0251110 A1* | 9/2010 | Mitani .......................... 715/273 |
| 2012/0236357 A1* | 9/2012 | Cech et al. .................... 358/1.15 |

FOREIGN PATENT DOCUMENTS

| | | |
|---|---|---|
| JP | 10-105548 A | 4/1998 |
| JP | 2005-219294 A | 8/2005 |
| JP | 2008-262405 A | 10/2008 |

\* cited by examiner

*Primary Examiner* — Thierry L Pham
(74) *Attorney, Agent, or Firm* — Fitzpatrick, Cella, Harper & Scinto

(57) ABSTRACT

The number of pages in which data of a structured document is laid out is determined in response to an instruction from the user, and whether the content of the data of the structured document is editable when the data is laid out is judged. The data of the structured document is then laid out in accordance with the judgment result and the determined number of pages.

22 Claims, 17 Drawing Sheets

F I G. 2
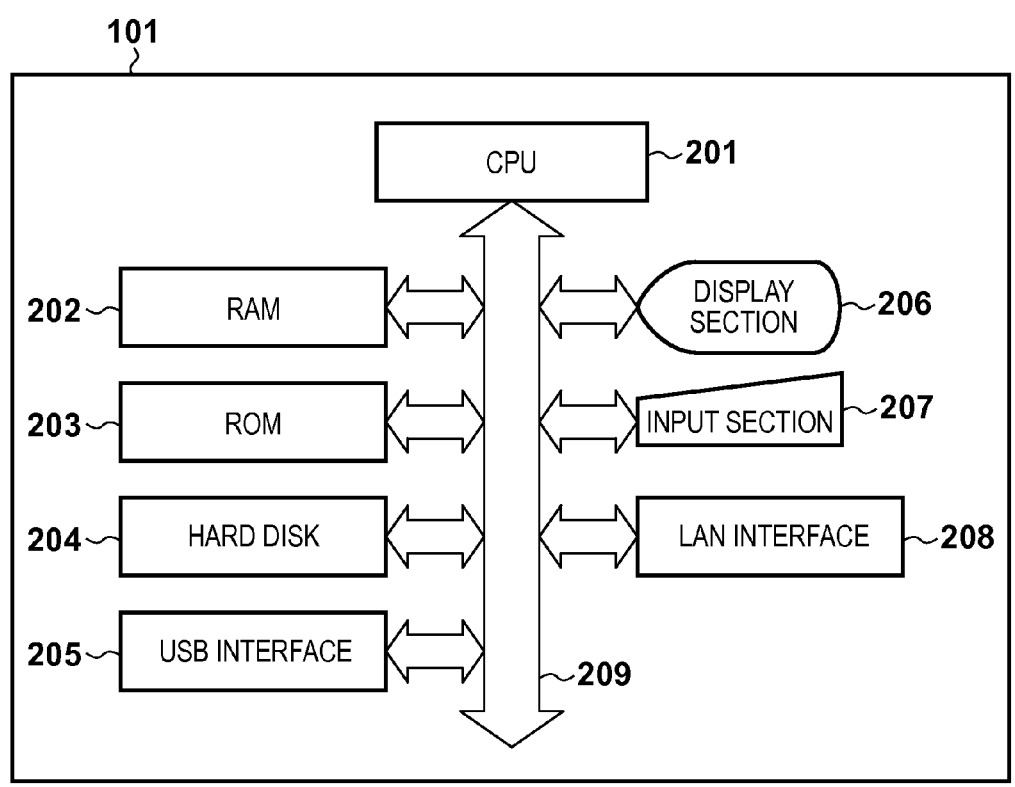

F I G. 12A
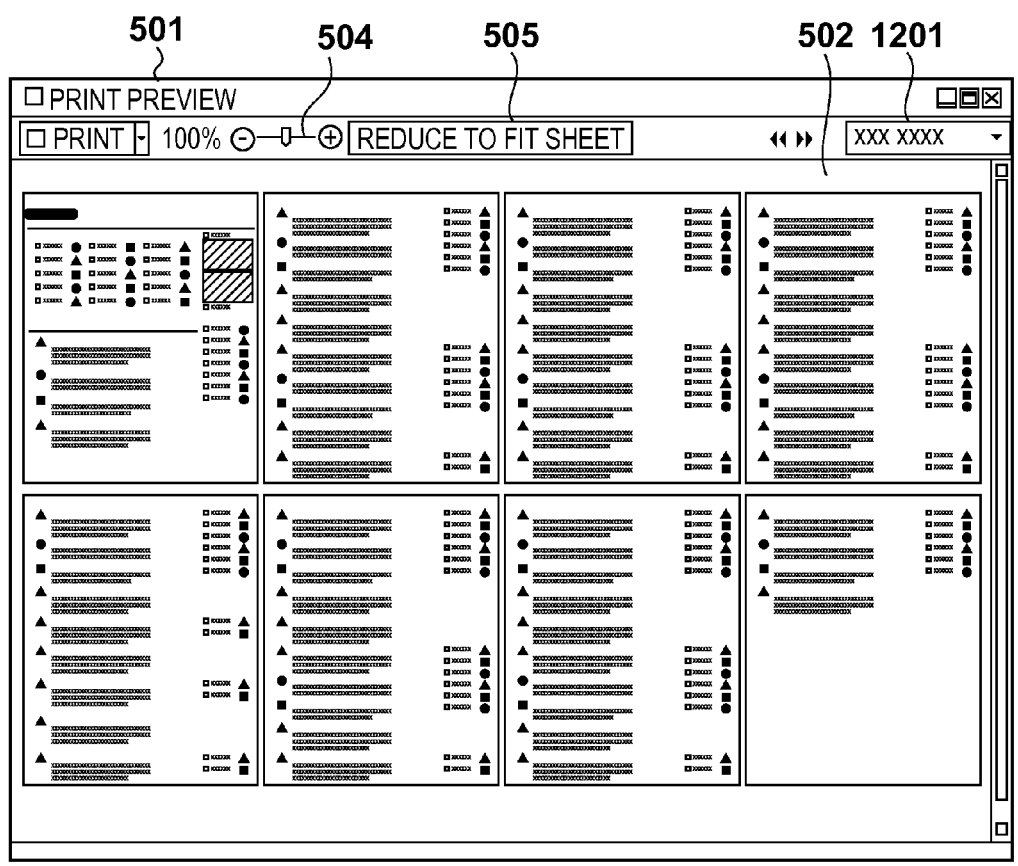

INFORMATION PROCESSING APPARATUS, INFORMATION PROCESSING METHOD, AND STORAGE MEDIUM FOR STORING PROGRAM

BACKGROUND OF THE INVENTION

1. Field of the Invention

The present invention relates to an information processing apparatus and information processing method for laying out data based on a structured document and a storage medium for storing a program.

2. Description of the Related Art

In recent years, it has become possible to obtain various types of information by accessing web pages on the Internet. A web page is a structured document written in a structured language such as Hyper Text Markup Language (HTML) or Extensible Hyper Text Markup Language (XHTML). A web page can be displayed on a display or output to a printer by a software application called a browser supporting the structured document.

When outputting a structured document to a printer, the user can specify the enlargement/reduction rate in a print preview of the browser to enlarge/reduce print data, thereby permitting the printer to print the print data in a desired size. Also, Japanese Patent Laid-Open No. 2005-219294 describes a method where, when the final page of print data has large blank space left in the bottom portion, the print data is printed with the content of the final page arranged to fall within the previous page.

In the prior art method described above, which is meant for printing the print data of the final page to fall within the previous data, no consideration is given to the total number of pages. Therefore, the print data may not be printed in the number of pages desired by the user. In order to ensure printing in a desired number of pages, it is necessary to set the reduction rate in the print preview of the browser in manual operation stepwise by repeating specification of the reduction rate and check of the print preview.

SUMMARY OF THE INVENTION

An aspect of the present invention is to eliminate the above-mentioned problems with the conventional technology. The present invention provides an information processing apparatus and information processing method capable of laying out data of a structured document appropriately and easily, and a storage medium for storing a program.

The present invention in its first aspect provides an information processing apparatus comprising: a decision unit configured to decide, in response to an instruction from a user, a number of pages in which data of a structured document is laid out; a determination unit configured to determine, based on the structured document, whether a content of the data of the structured document is editable when the data is laid out; and a layout unit configured to lay out the data of the structured document in accordance with the determination result by the determination unit and the number of pages decided by the decision unit.

The present invention in its second aspect provides an information processing method comprising the steps of: in response to an instruction from the user, deciding the number of pages in which data of a structured document is laid out; determining, based on the structured document, whether a content of the data of the structured document is editable when the data is laid out; and laying out the data of the structured document in accordance with the determination result in the determining step and the number of pages decided in the deciding step.

The present invention in its third aspect provides a computer-readable storage medium for storing a program, the program causing a computer to execute the steps of: in response to an instruction from the user, deciding the number of pages in which data of a structured document is laid out; determining, based on the structured document, whether a content of the data of the structured document is editable when the data is laid out; and laying out the data of the structured document in accordance with the determination result in the determining step and the number of pages decided in the deciding step.

According to the present invention, data of a structured document can be laid out appropriately and easily.

Further features of the present invention will become apparent from the following description of exemplary embodiments with reference to the attached drawings.

BRIEF DESCRIPTION OF THE DRAWINGS

FIG. 2 is a block diagram showing a configuration of the information processing apparatus.

FIGS. 12A-12C are views showing changes of the print preview screen in the embodiment.

DESCRIPTION OF THE EMBODIMENTS

Figure 1:
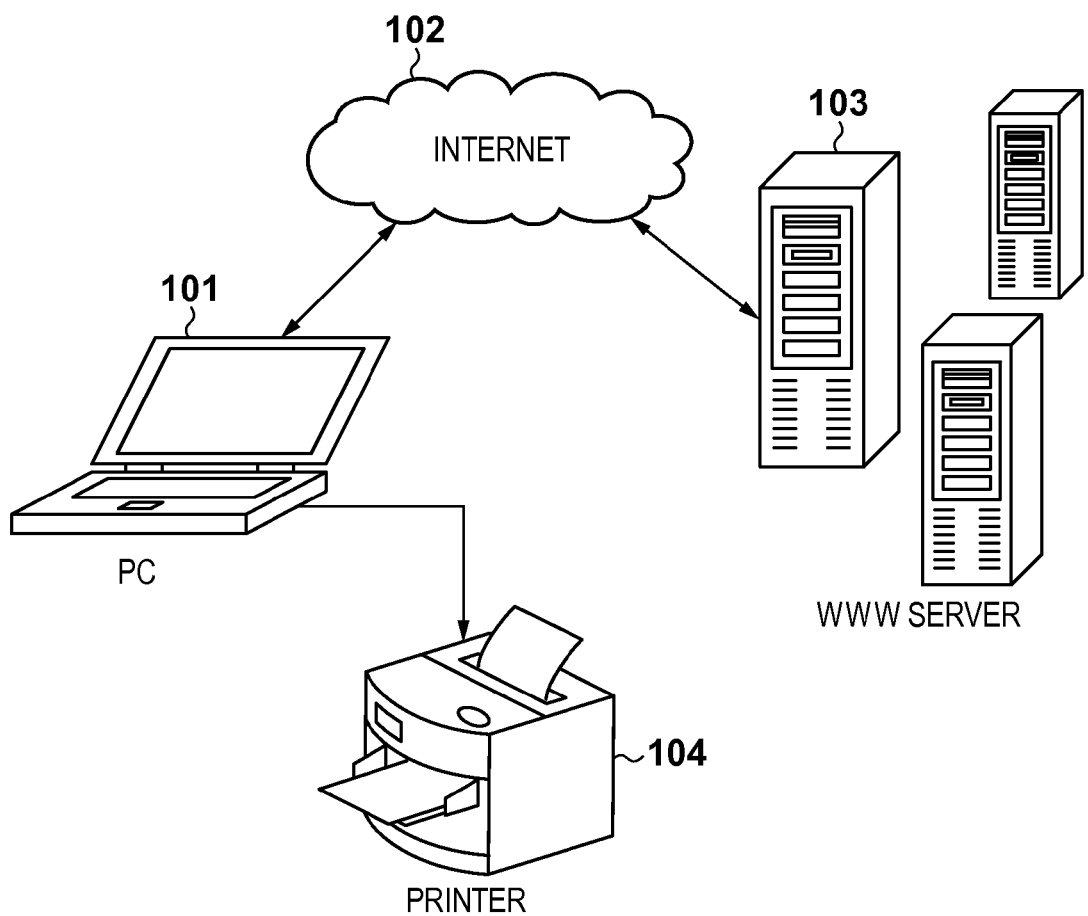
FIG. 1 is a view showing a configuration of a system including an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Elements having the same configuration are given the same reference numerals and their explanation is not repeated.

FIG. 1 is a view showing a configuration of a system including an information processing apparatus of an embodiment of the present invention. A PC 101 serving as the information processing apparatus downloads web pages from a plurality of WWW servers 103 via the Internet 102 and displays such web pages. The web pages are structured documents written in HTML and XHTML. The PC 101, connected to a printer 104, can download web pages from the WWW servers 103 as documents to be printed and output the contents of the documents to the printer 104 for printing.

FIG. 2 is a block diagram showing a configuration of the PC 101. A CPU 201 processes data and commands according to a program stored in a RAM 202, a ROM 203, or a hard disk 204. The RAM 202 is used as a temporary storage area when the CPU 201 performs various types of processing. The hard disk 204 stores an operating system (OS), software applications including a browser, etc. A USB interface 205 is an interface to which a USB cable is connected, through which data communication with the printer 104 is established. Note that the communication with the printer 104 may be performed via SCSI or wirelessly, for example, instead of with a USB cable.

A display section 206, including a CRT or a liquid crystal display and a graphic controller, displays a web page downloaded from any WWW server 103, a print preview image, a graphic user interface (GUI), etc. An input section 207 is a block allowing the user to input various types of instructions into the PC 101, and is a pointing device or a keyboard, for example. A system bus 209 connects the CPU 201, the RAM 202, the ROM 203, the hard disk 204, etc. mutually. A LAN interface 208 is an interface to which a LAN cable is connected, through which data communication with the external WWW servers 103 is established via a router not shown and the Internet 102. Note that, in this embodiment, the data communication may be performed wirelessly by a wireless-supporting interface, for example. In FIG. 2, the PC 101 is of a notebook type where the display section 206 and the input section 207 are integrated with the control section including the CPU 201 and the RAM 202. Alternatively, the PC 101 may be of a desktop type where the display section 206 and the input section 207 are in separate bodies.

Figure 3:
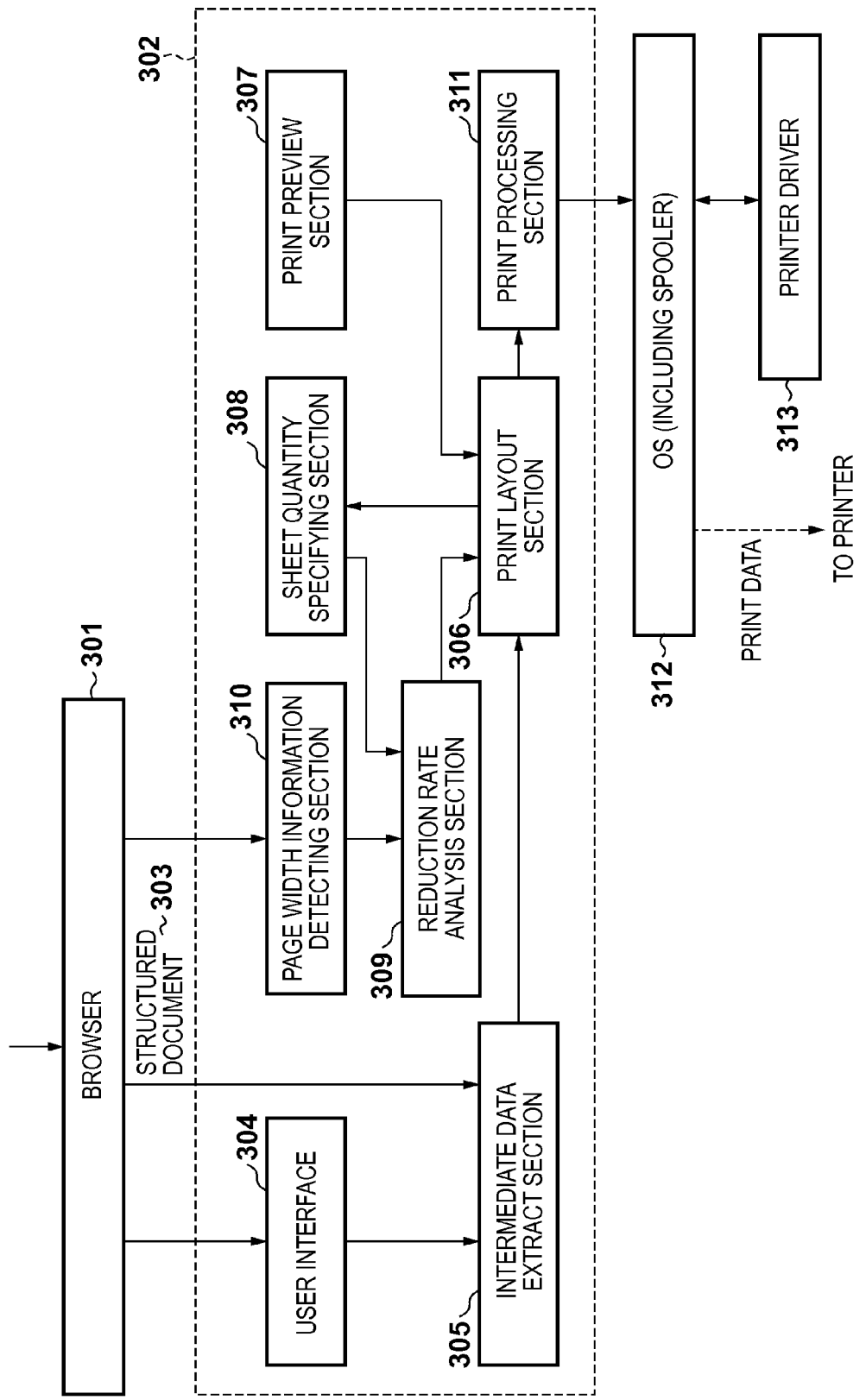
FIG. 3 is a block diagram showing a software configuration of the information processing apparatus.

FIG. 3 is a block diagram showing a software configuration of the PC 101. A browser 301, which is an application for display of web pages, downloads web pages from the WWW servers 103 to the hard disk 204 of the PC 101 and displays them on the display section 206. A web page is a structured document written in HTML, XHTML, etc., where elements constituting the structured document, such as texts and images, are described using tags. A file called a cascading style sheet (CSS) specifying the display style of these elements is designated separately in the structured document. The browser 301 analyzes such structured documents and displays them on the display section 206.

A structured document print module 302 is a plug-in software application called from the browser 301 using a structured document 303 as a parameter. The browser 301 executes the structured document print module 302 when the user starts the browser 301. In this embodiment, the structured document print module 302 displays a print preview screen, and, during the display of the print preview, arranges print data so as to fit into the number of pages specified by the user.

Figure 4:
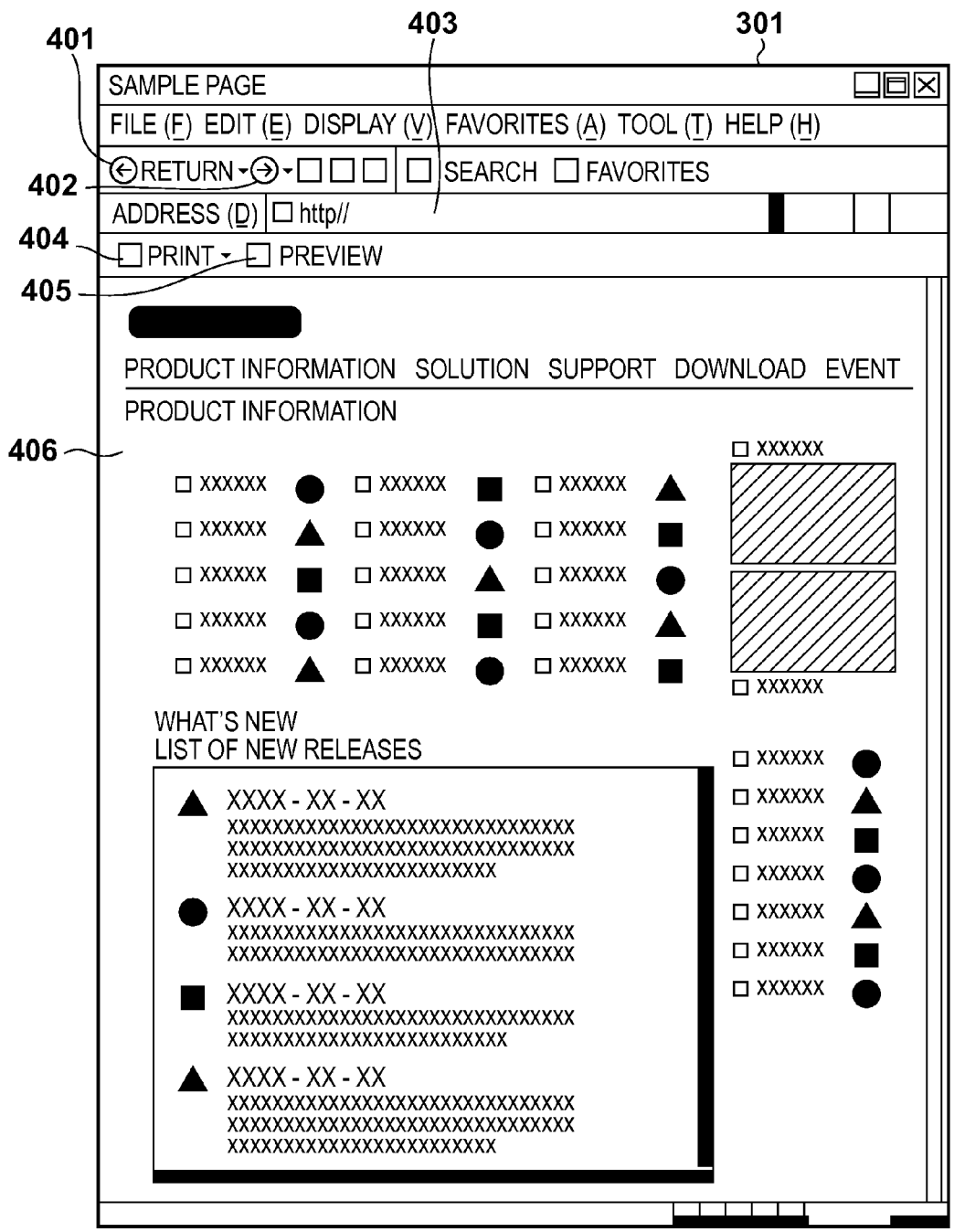
FIG. 4 is a view showing an example of a GUI screen.

In the structured document print module 302, a user interface 304 is started simultaneously with the execution of the structured document print module 302. This leads to display of a print button for start of printing and a print preview button for display of a print preview in a window of the browser 301. FIG. 4 is a view showing an example of the GUI screen with a print button 404 and a print preview button 405 displayed in the browser 301, details of which will be described later.

An intermediate data extract section 305 extracts the structured document 303 from the browser 301 as an intermediate data file at the time when the print button 404 or the print preview button 405 displayed by the user interface 304 is pressed. The intermediate data file is data for printing. The intermediate data file, which may be bit map data, is constructed so that character information and graphic information can be held as vector data. For example, a portable document format (PDF), an enhanced metafile format (EMF), etc. may be used as the intermediate data file.

A print layout section 306 lays out the intermediate data file extracted by the intermediate data extract section 305 to the sheet size according to print settings. Specifically, elements (objects) such as text data and image data included in the intermediate data file are arranged in the area of the sheet size. The print settings, including information such as the sheet size, the resolution, and the size of the print area in the sheet size, are acquired from a printer driver 313 via an OS 312. Note that the size of the print area is not necessarily acquired as a print setting, but may be determined by referring to information on margins set for the sheet size.

Figure 5:
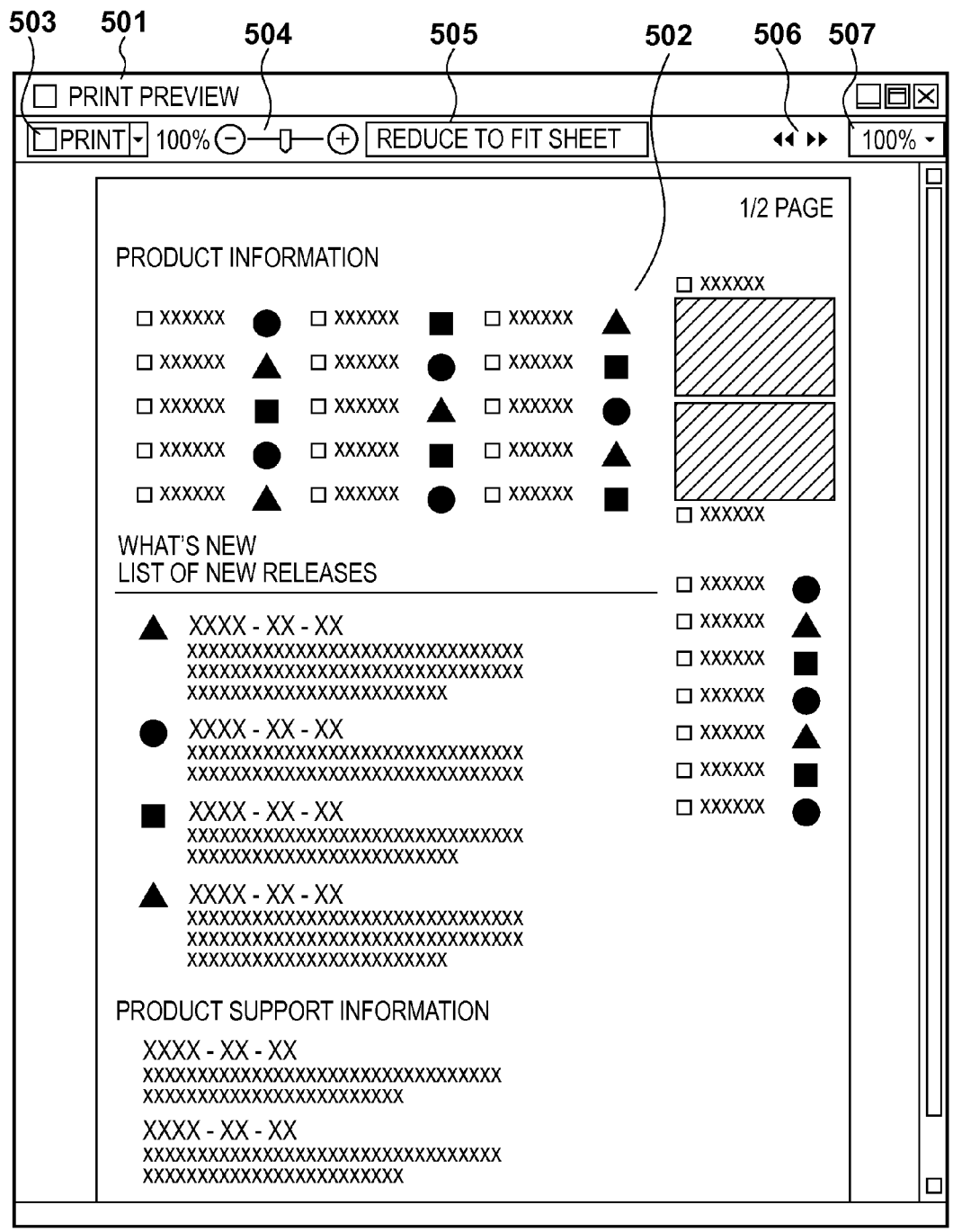
FIG. 5 is a view showing an example of a GUI screen for print previewing.

A print preview section 307 displays the intermediate data file laid out by the print layout section 306 on the display section 206 as a print preview. FIG. 5 is a view showing an example of a GUI screen for print previewing.

In this embodiment, during display of a print preview, a button 505 is presented for reducing the intermediate data so as to lay out the data in the number of pages specified by the user with no blank space left on the bottom portion of the print area of each page (fitting the data to each page). Details of this screen will be described later.

A sheet quantity specifying section 308, started at the pressing of the reduction button 505, acquires the number of print sheets (the number of print pages; n in this embodiment) in the current print settings from the print layout section 306. The sheet quantity specifying section 308 starts a reduction rate analysis section 309, specifying the number of sheets n−1 reduced from n by one sheet (page).

The reduction rate analysis section 309, started by the sheet quantity specifying section 308 using the number of sheets n−1 as a parameter, analyzes the reduction rate for reducing print data 502 displayed on a print preview screen 501 so as to fit into the specified number of sheets n−1. The page size of the n−1 sheets is calculated from the print settings (the sheet size, the size of the print area, etc.) acquired from the printer driver 313. The reduction rate is determined from the size of the print data and the page size.

By reducing the intermediate data at this reduction rate, the intermediate data can be laid out in n−1 pages with no unnecessary blank space left in the height direction on the final page. Details of the analysis of the reduction rate will be described later.

A page width information detecting section 310 analyzes the CSS file and tag attributes of the structured document 303, and detects whether the page width of the structured document is variable or fixed. The reduction rate analysis section 309 analyzes the reduction rate in a reduction method corresponding to the detection result. Details of the page width and the reduction method corresponding to the detection result will be described later.

In this embodiment, the reduction rate analysis section 309 analyzes the reduction rate in the reduction method corresponding to the detection result from the page width information detecting section 310. The print layout section 306 lays out the intermediate data according to the analyzed reduction rate. In this way, the layout of the print data fitting into a predetermined number of pages can be determined.

When receiving an instruction of starting printing from the user, a print processing section 311 changes the print settings as required according to the layout information of the print data laid out by the print layout section 306. The print processing section 311 then executes drawing processing for the printer driver 313 via the OS 312. The OS 312 presents an application programming interface (API) for exchanging print setting data between the structured document print module 302 and the printer driver 313 and an API for performing drawing processing. The OS 312 includes various types of control software such as a spooler system for managing print jobs and a port monitor that outputs printer commands to a port, details of which are however omitted here. The printer driver 313 generates print data according to the drawing processing executed by the print processing section 311, converts the data to printer commands, and transmits the converted printer commands to the printer 104. Thereafter, the printer 104 prints them on sheets.

FIGS. 4 and 5 will be described next. The browser 301 shown in FIG. 4 displays the structured document 303 as a web page on a web page display area 406. The browser 301 also includes a backward button 401 and a forward button 402 for changing the web page to be displayed and an address input area 403. The browser 301 further includes the print button 404 and the print preview button 405 displayed by the user interface 304 of the structured document print module 302.

FIG. 5 is a print preview screen displayed when the print preview button 405 is pressed in FIG. 4. The print preview screen 501 includes print data 502 displayed as the print preview when the structured document 303 is to be printed under the current print settings and a print button 503 for start of printing. The print preview screen 501 also includes page switch buttons 506 for switching the page displayed as the print preview and a display magnification combo box 507 for enlarging or reducing the display. The display magnification combo box 507 permits selection among display magnification ratios such as the ratios of 100%, 150%, 200%, 80%, 50%, and 30%, thumbnail display, and 2-page display. The print preview screen 501 further includes a slider bar 504 for accepting specification of the enlargement/reduction rate for enlarged/reduced printing and the reduction button 505 (reduction acceptance button) for accepting an instruction of reducing data to fit into the sheets. When the reduction button 505 is pressed, it is possible to display a print preview image in a predetermined number of pages with no unnecessary blank space left in the height direction on the final page. Also, in this embodiment, the print data is further reduced every time the reduction button is pressed.

Figure 6A:
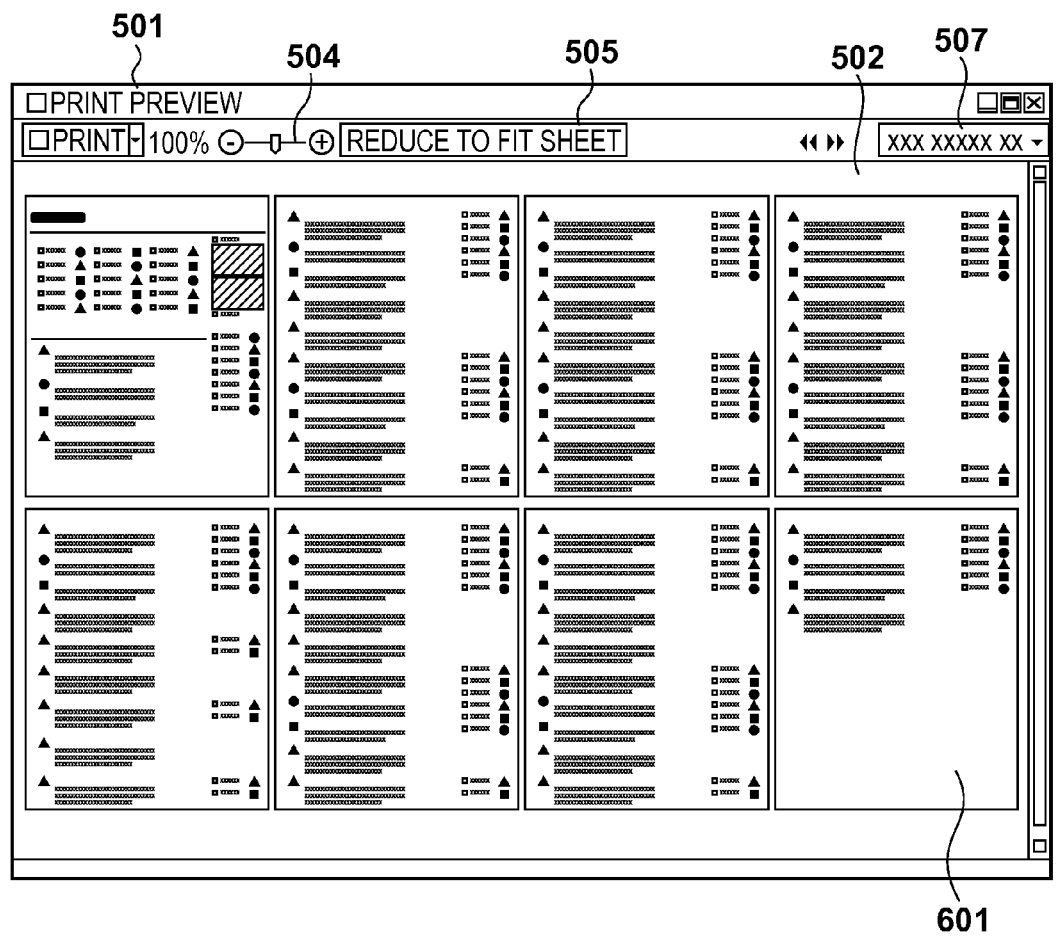
FIGS. 6A-6E are views showing changes of the print preview screen with pressing of a reduction button.
Figure 6B:
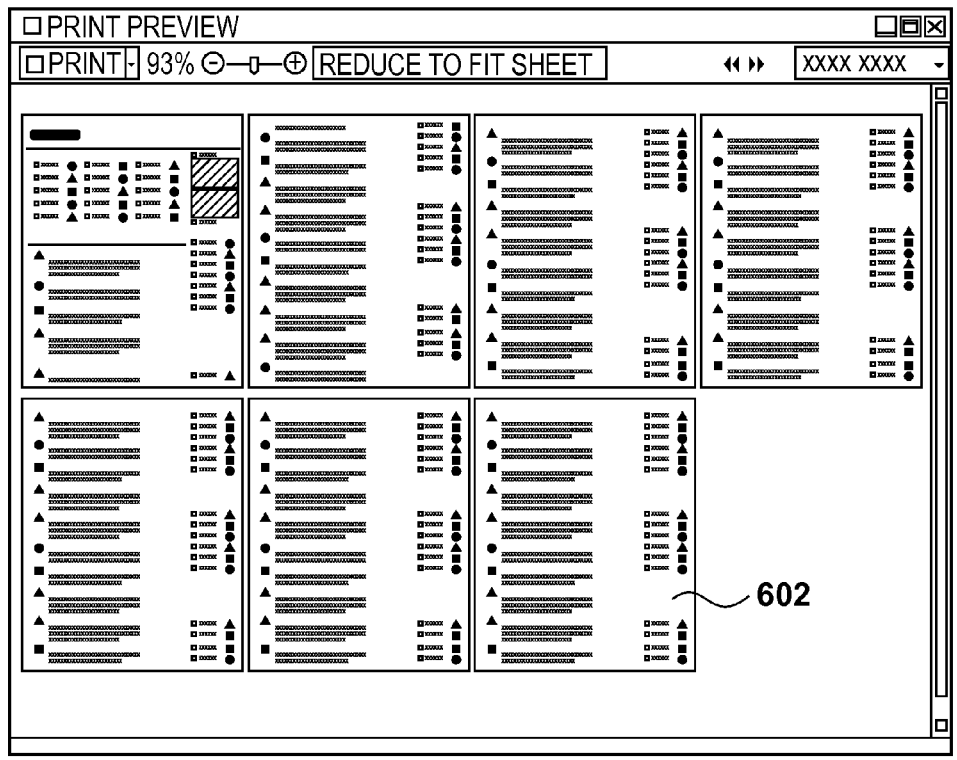

FIGS. 6A-6E are views showing changes of the print preview screen with repeated pressing of the reduction button 505 on the print preview screen 501. FIG. 6A shows the GUI screen presented when thumbnail display is selected as the display magnification in the display magnification selection combo box 507 on the print preview screen 501 in FIG. 5. As a result of selection of the thumbnail display, print images laid out in eight sheets are displayed on the print preview screen 501. A sheet 601 of the eighth page is the final page, where the print image finishes in the middle of the sheet leaving blank space in the bottom portion. FIG. 6B shows a print preview screen presented when the reduction button 505 is pressed in the state shown in FIG. 6A.

Figure 6C:
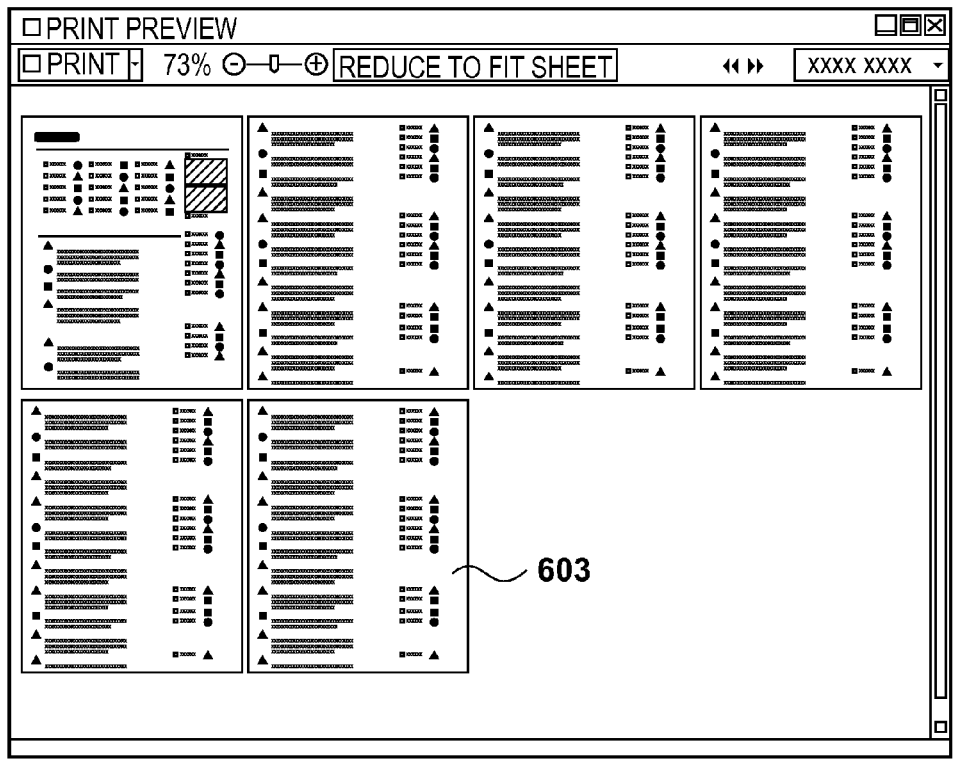
Figure 6D:
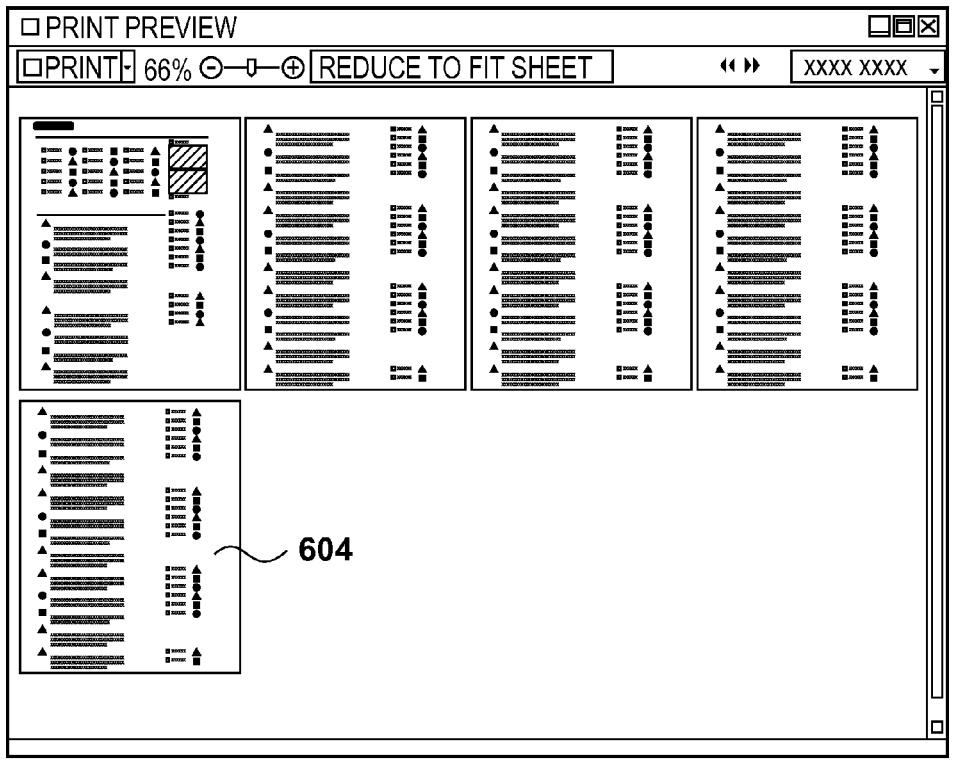

As shown in FIG. 6B, the print image is displayed as fitted into seven sheets. FIG. 6C shows a print preview screen presented when the reduction button 505 is further pressed in the state shown in FIG. 6B. As shown in FIG. 6C, the print image is displayed as fitted into six sheets. FIG. 6D shows a print preview screen presented when the reduction button 505 is further pressed in the state shown in FIG. 6C. As shown in FIG. 6D, the print image is displayed as fitted into five sheets.

Figure 6E:
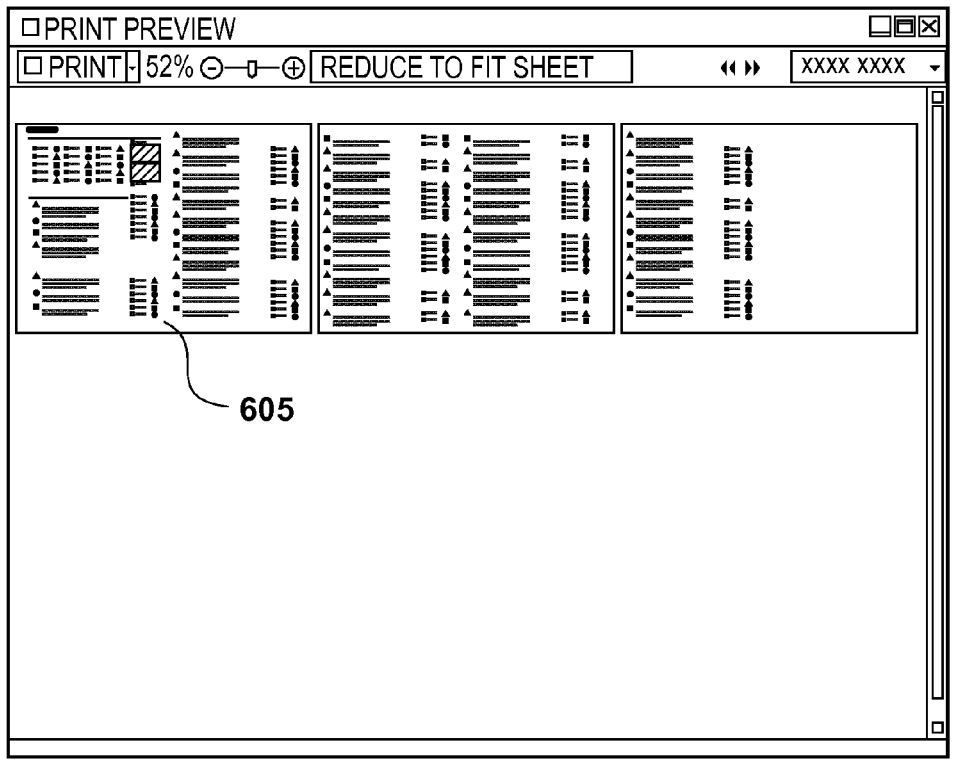

FIG. 6E shows a print preview screen presented when the reduction button 505 is further pressed in the state shown in FIG. 6D. As shown in FIG. 6E, the print image is fitted, not into four sheets, but into three sheets by rotating the sheets to landscape orientation and changing the layout to two columns. In the further reduction from the state in FIG. 6D, if one page is laid out on one sheet, the blank space in the page width direction will become large. By laying out a plurality of pages on one sheet as in FIG. 6E, the blank space in the page width direction can be reduced.

In this embodiment, the reduction rate analysis section 309 changes the orientation of the sheet and the number of columns as described above as required. The reduction rate analysis section 309 acquires the size of the print area set in the print settings, and judges whether the sheet orientation and the number of columns should be changed or not (editable or not) according to the acquired size of the print area. When performing the changes based on the judgment result, the reduction rate analysis section 309 determines the reduction rate of the intermediate data so that the data can fit into each of the plurality of pages allocated to one sheet.

Alternatively, the print layout section 306 may judge whether the sheet orientation and the number of columns should be changed. In this case, the print layout section 306 compares the size of the print data reduced at the reduction rate determined by the reduction rate analysis section 309 to the size of the print area set in the print settings, to judge whether the sheet orientation and the number of columns should be changed.

When determining to change the sheet orientation and the number of columns, the reduction rate analysis section 309 determines the reduction rate according to the size of one page out of a plurality of pages allocated to one sheet. The print layout section 306 determines the layout according to the determined reduction rate.

The print preview section 307 displays a print preview image as that shown in FIG. 6E according to the determined layout, and also notifies the print processing section 311 of the sheet orientation and the number of columns changed as described above, to allow the print processing section 311 to change the print settings. In this way, when the user issues an instruction of execution of printing in the state of FIG. 6E, printing corresponding to the print preview can be performed.

The layout of two columns in landscape orientation was described in this embodiment. Alternatively, the configuration may be made to determine a layout with the smallest number of sheets and the smallest blank space among layouts of a total of six different combinations of the sheet orientation, portrait or landscape, and the number of columns, one column, two columns, or three columns.

As described above, every time the reduction button 505 is pressed, the reduction rate analysis section 309 of the structured document print module 302 calculates the reduction rate for reducing the print data to fit into the specified number of sheets n−1, changes the print layout settings, and updates the print preview. At this time, the reduction rate analysis section 309 changes the sheet orientation and the number of columns as required and displays the resultant print preview.

In this embodiment, the reduction button 505 plays a role of accepting an instruction of page reduction by the user. Every time the button is pressed, the print preview is displayed in a layout having pages reduced by one.

Thus, by pressing the reduction button 505, the user can lay out the print data in a desired number of pages easily with no unnecessary blank space left on the final page. Moreover, as shown in FIGS. 6D and 6E, the print settings (the sheet orientation, the number of columns) are automatically changed in response to pressing of the reduction button 505 indicating an instruction of reduction of the print data. Thus, the user can lay out the print data appropriately without the necessity of special operation for changing the print settings.

In the examples shown in FIGS. 6A-6E, the print data is reduced every time the reduction button 505 is pressed. Alternatively, an enlargement button for enlarging the print data may be provided. In this case, also, every time the enlargement button is pressed, the print data is enlarged, increasing the number of pages by one each. It is also ensured that no blank space is left on the bottom portion of the final page.

Figure 7A:
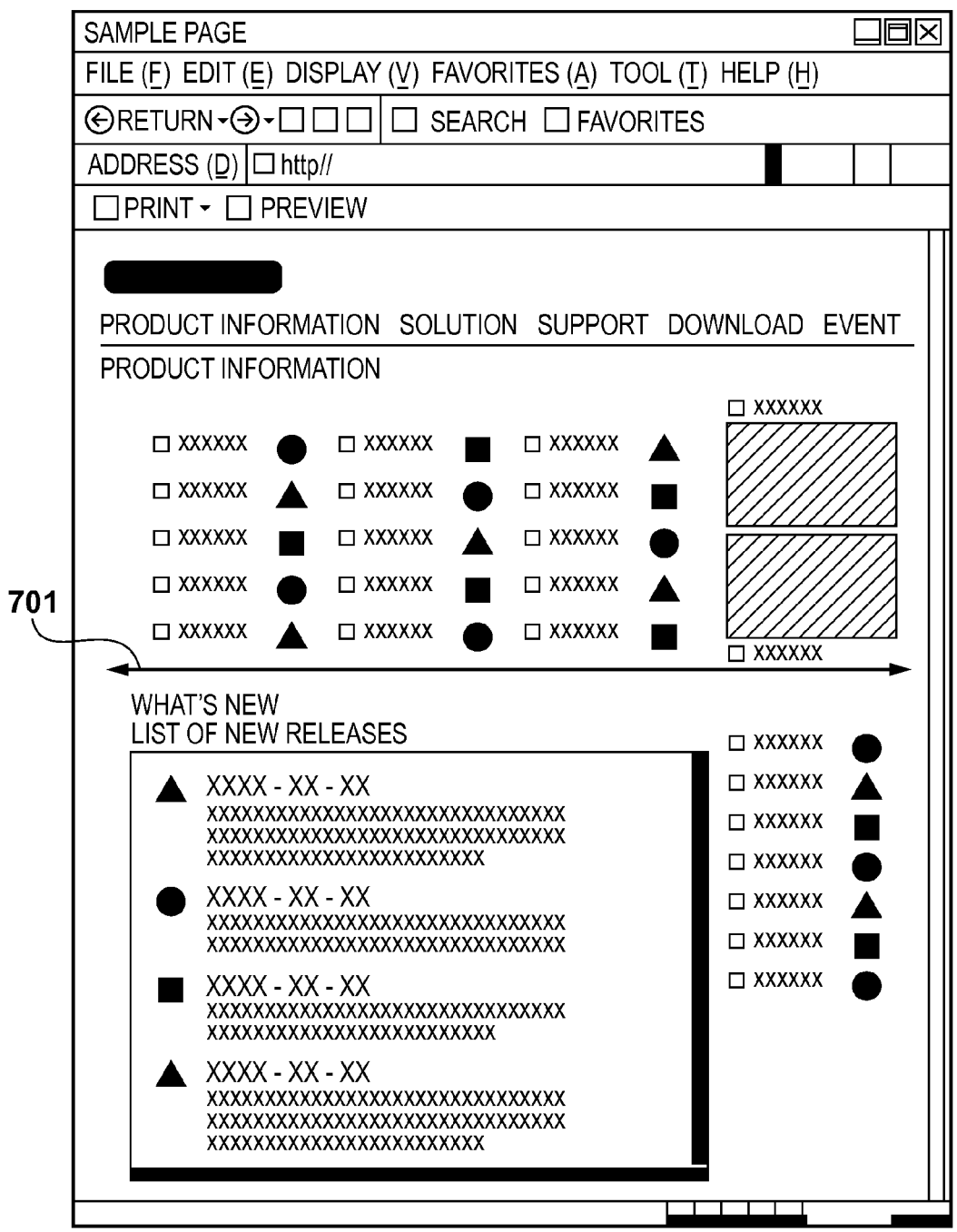
FIGS. 7A and 7B are views shown to describe a structured document having a fixed page width.
Figure 7B:
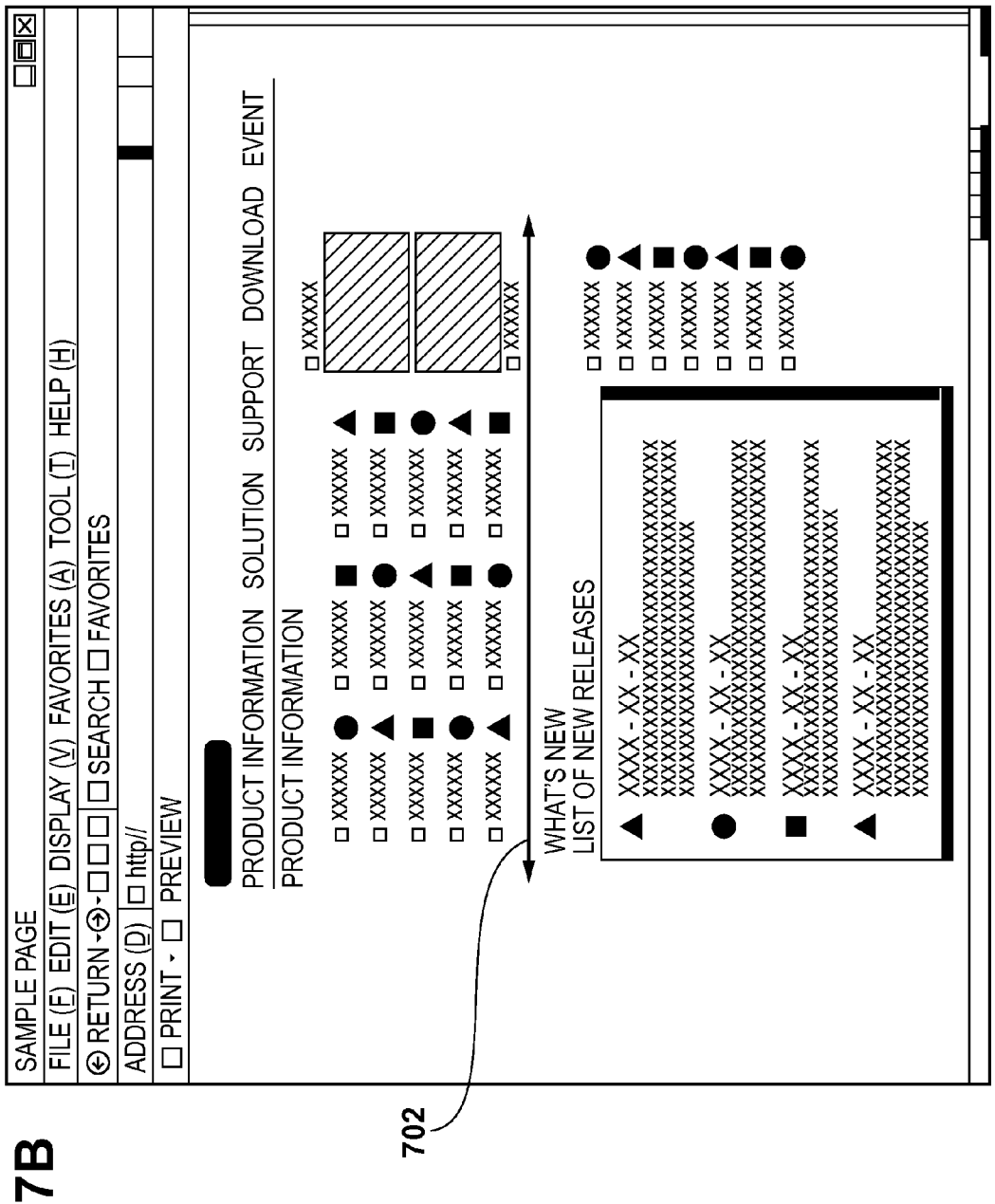

The processing of the page width information detecting section 310 will be described with reference to FIGS. 7A, 7B, 8A, and 8B. The page width information detecting section 310 detects page width information on whether the page width of the structured document 303 is fixed or variable. The reduction rate analysis section 309 analyzes the reduction rate using the detected page width information. FIG. 7A is a view showing an example of the browser screen where the structured document 303 having a fixed page width is displayed by the browser 301. FIG. 7B shows a screen with the window size of the browser 301 widened from that shown in FIG. 7A. Since the page width of the structured document 303 is fixed, the page width 701 of the structured document 303 shown in FIG. 7A and the page width 702 thereof shown in FIG. 7B are the same in the number of pixels.

Figure 8A:
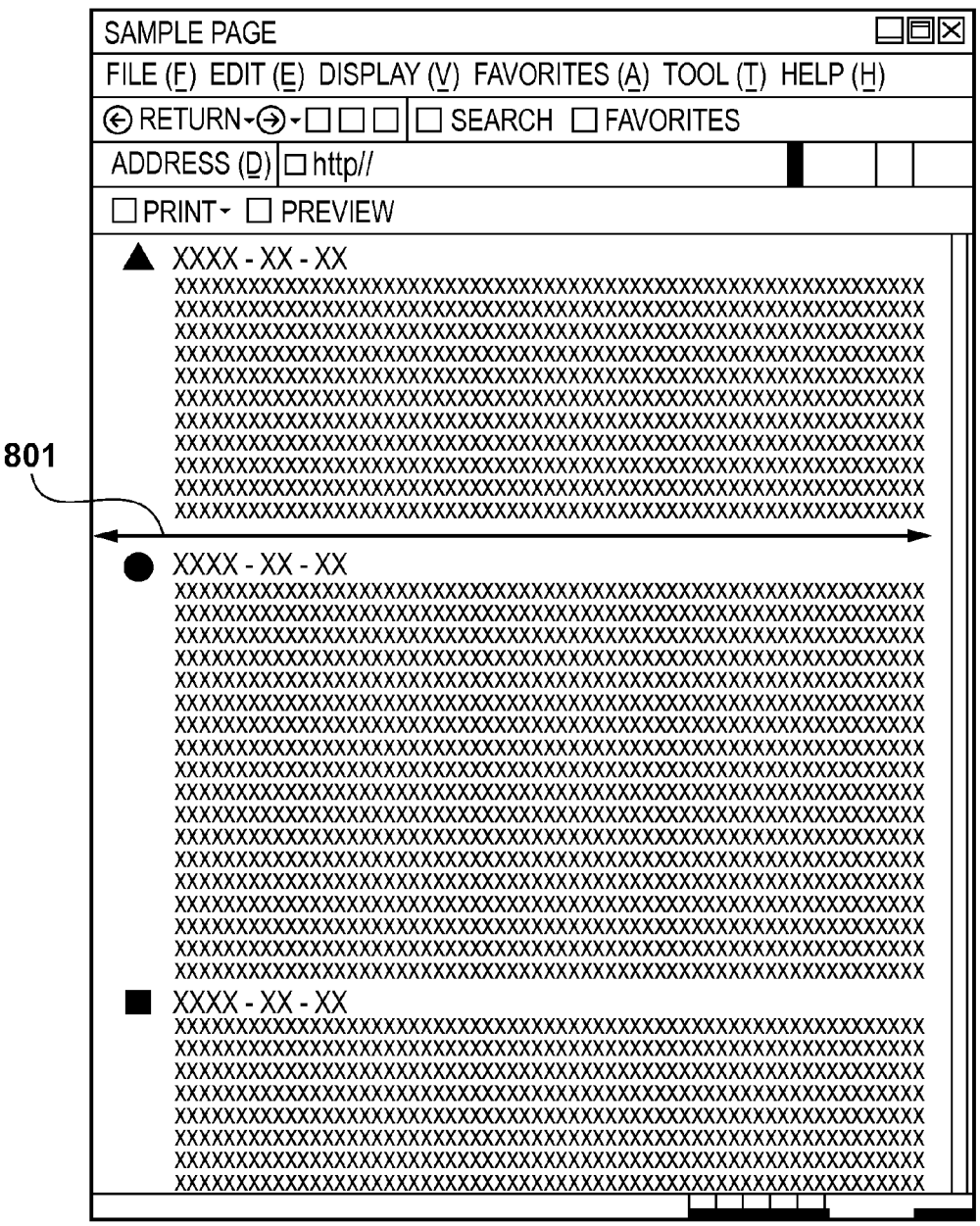
FIGS. 8A and 8B are views shown to describe a structured document having a variable page width.
Figure 8B:
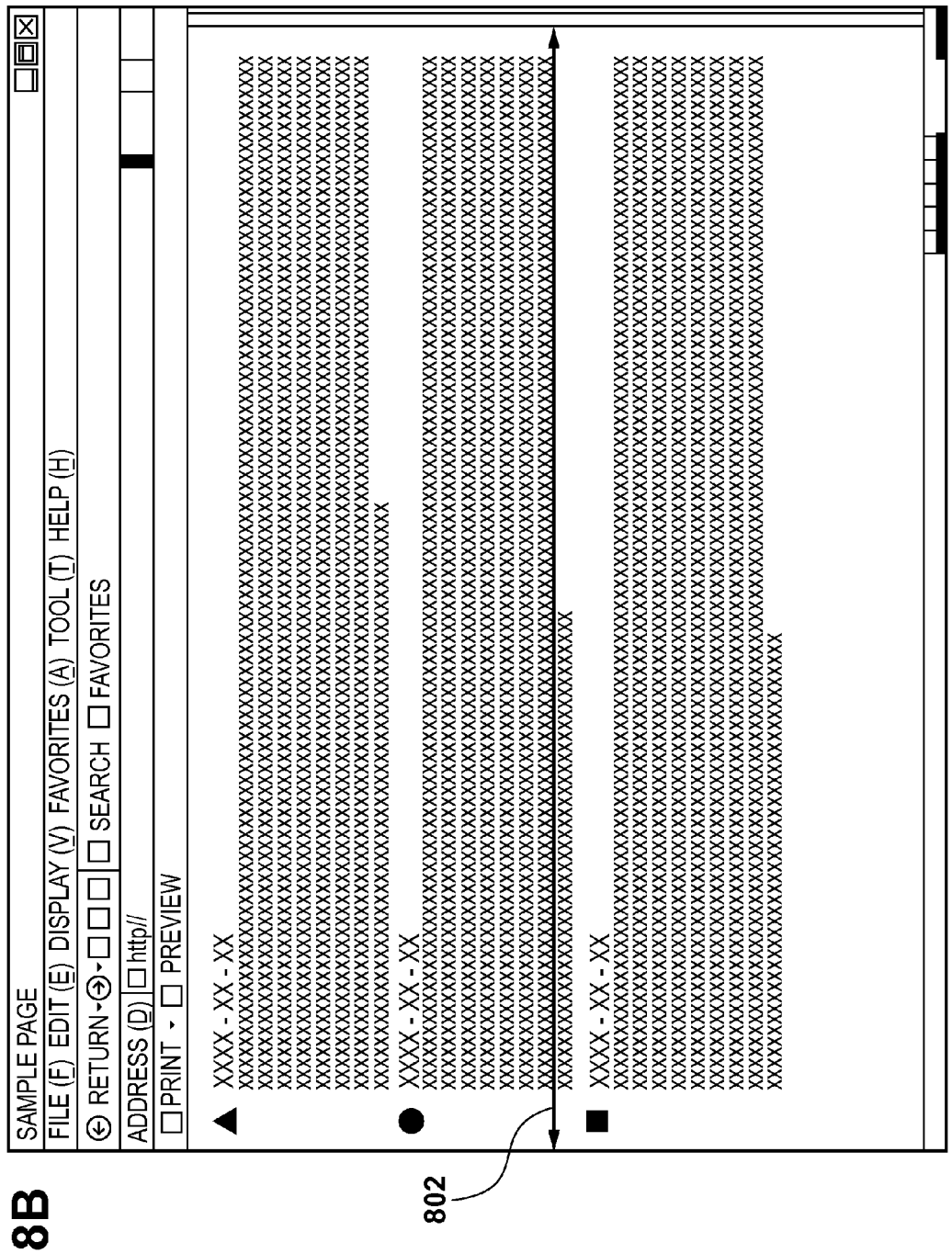

FIG. 8A is a view showing an example of the browser screen where the structured document 303 having a variable page width is displayed by the browser 301. FIG. 8B shows a screen with the window size of the browser 301 widened from that shown in FIG. 8A. Since the page width of the structured document 303 is variable, the page width 802 of the structured document 303 shown in FIG. 8B is larger in the number of pixels than the page width 801 thereof shown in FIG. 8A.

As described above, whether the page width is fixed or variable is already defined in the structured document 303, and thus can be determined by analyzing the structured document. Specifically, the document is displayed with its page width being fixed as shown in FIGS. 7A and 7B when the return position of a text portion of the structured document 303 is fixed, while it is displayed with its page width being variable as shown in FIGS. 8A and 8B when the return position varies. The page width information detecting section 310 acquires the width attributes or styles of body tags and other tags of the structured document 303, and detects whether the page width has been specified by a fixed value such as the number of pixels, or specified by a variable value such as the proportion of the page width with respect to the window width of the browser 301, based on the acquired information. Using this page width information, the reduction rate analysis section 309 analyzes the reduction rate required to fit the print data into the number of pages specified by the sheet quantity specifying section 308.

Figure 9A:
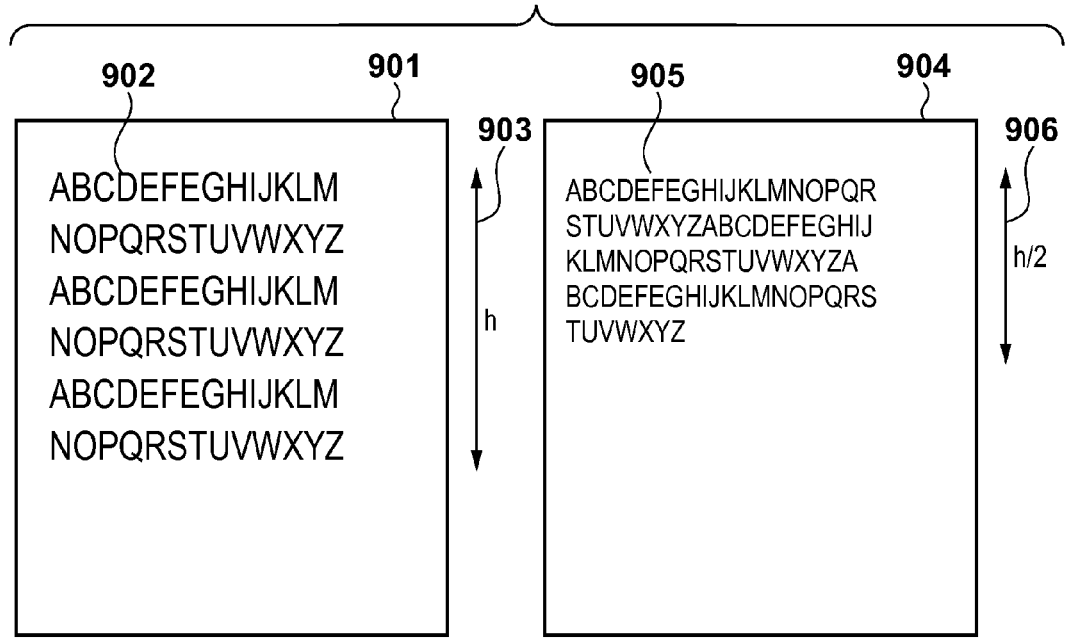
FIGS. 9A and 9B are views shown to describe processing of analyzing the reduction rate.
Figure 9B:
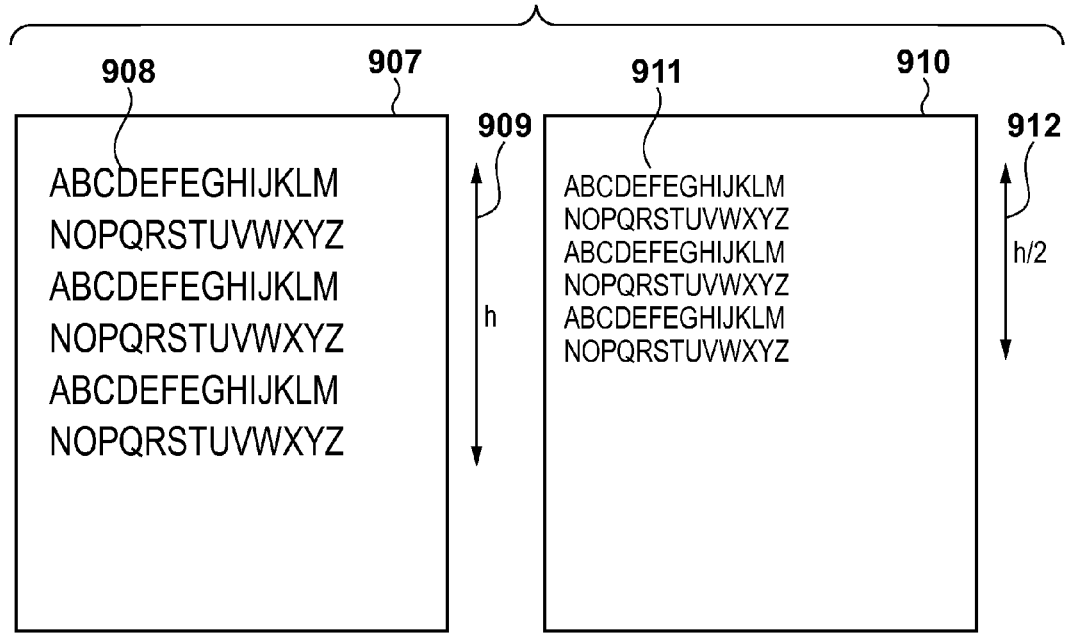

FIGS. 9A and 9B are views shown to describe the processing of analyzing the reduction rate according to the page width information of the structured document 303 performed by the reduction rate analysis section 309. An image 901 in FIG. 9A represents a sheet of the structured document 303 having a variable page width at the time of printing in the initial settings. A print image 902 is arranged in the image 901, where the height (length in the longitudinal direction of the page) 903 of the print image 902 is h. An image 904 shows a page where the print image 902 is reduced to a height h/2 by the reduction rate analysis section 309, to have a print image 905 in the image 904. In this way, when the page width is variable, the reduction or enlargement (variable magnification processing) of the page in the height direction can be performed by editing processing such as changing the return position of the text.

In the reduction of the print image 902 to the print image 905, the area of the image is reduced to about ½, and the reduction rate is about $1/\sqrt{2}$. Strictly speaking, the reduction rate is influenced by the size of characters, the return position, word wrapping, presence/absence of an image, etc.

By contrast, an image 907 in FIG. 9B represents a sheet of the structured document 303 having a fixed page width at the time of printing in the initial settings. A print image 908 is arranged in the image 907, where the height 909 of the print image 908 is h. An image 910 shows a page where the height of the print image 908 is reduced to h/2 by the reduction rate analysis section 309. In the reduction of the print image 908 to the print image 911, the area of the image is reduced to about ¼, and the reduction rate is about ½. As in FIG. 9A, strictly speaking, the reduction rate is influenced by the size of characters, the return position, word wrapping, presence/absence of an image, etc.

As described above, in reduction of the print image of the structured document 303 having a variable page width, when the reduction ratio of the print image in the height direction is r, the reduction rate is about $\sqrt{r}$. By contrast, in reduction of the print image of the structured document 303 having a fixed page width, the reduction rate is about r. In this embodiment, the reduction rate analysis section 309 analyzes the reduction rate required to fit the print data into the number of pages specified by the sheet quantity specifying section 308, using a method of calculating the reduction rate corresponding to the page width information.

Figure 10:
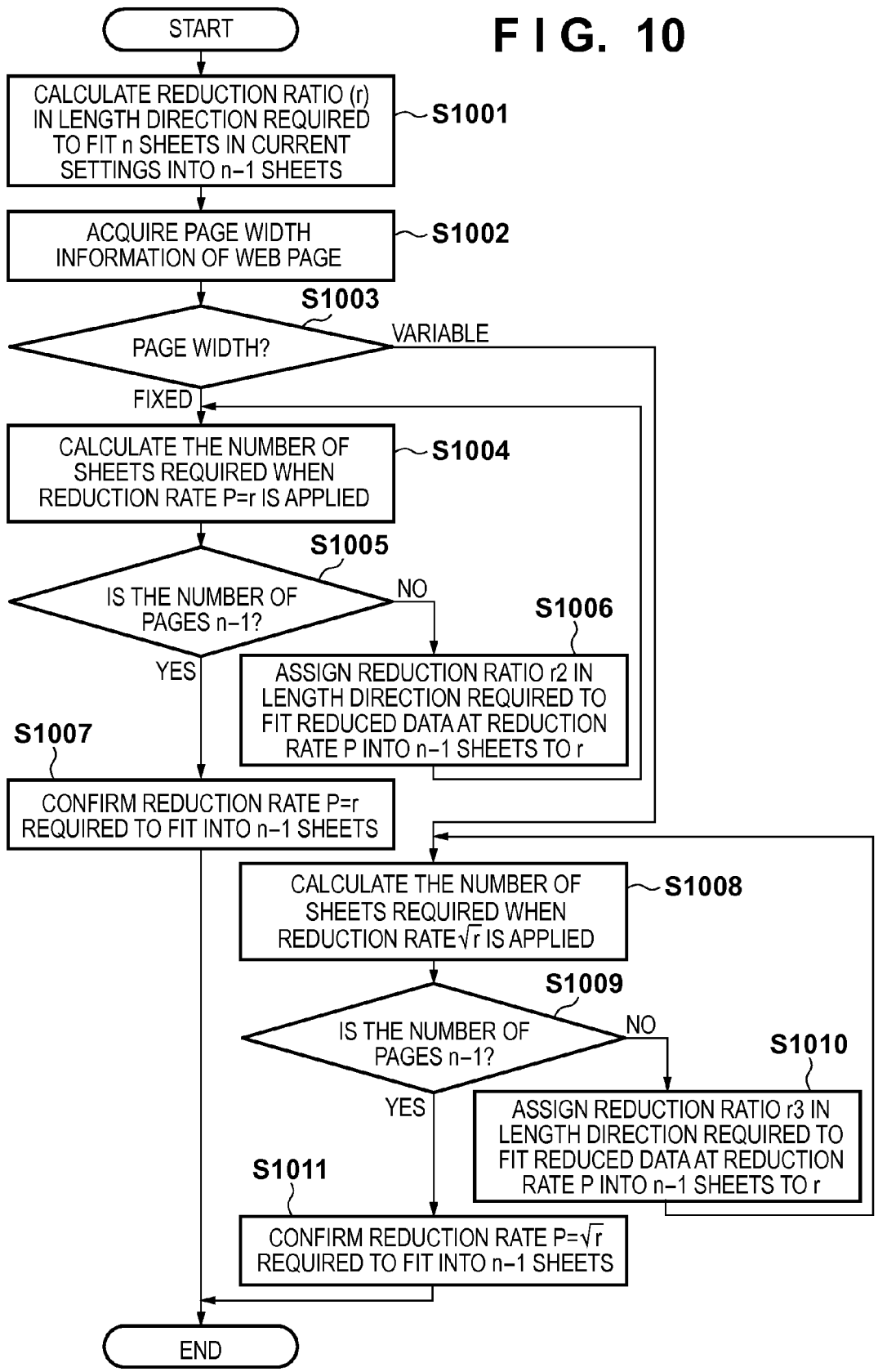
FIG. 10 is a flowchart showing a procedure of preview display processing in an embodiment of the present invention.

FIG. 10 is a flowchart showing a procedure of calculating the reduction rate of print data performed by the reduction rate analysis section 309 in this embodiment. The process steps shown in FIG. 10 are executed by the CPU 201 of the PC 101, for example. When the reduction button 505 on the print preview screen 501 is pressed, the CPU 201 starts the processing steps by the reduction rate analysis section 309 of the structured document print module 302.

The CPU 201 calculates the reduction ratio r in the height direction required to fit print data of n sheets in the current print settings into n−1 sheets (S1001). For example, in FIGS. 6A-6E, in the initial state of FIG. 6A, the print image is displayed up to a half of the eighth page (converted into 7.5 sheets). Therefore, the reduction ratio r in the height direction for fitting the print data into seven sheets is calculated to be 7/7.5 (approximately 0.93).

In S1001, the reduction rate analysis section 309 acquires the size of the print data, and also acquires the sheet size, the size of the print area, and the number of pages allocated to one sheet in the print settings, from the print layout section 306. The reduction rate analysis section 309 calculates the size of one page from the print settings and compares the size of the print data to the size of one page. From this, the reduction rate analysis section 309 can determine the number of pages of the print data laid out and the occupation of the content of the final page on the sheet. In this way, it is possible to determine that the print data is laid out up to a half of the eighth sheet in the initial state.

The above determination processing may be performed, not by the reduction rate analysis section 309, but by the print layout section 306. In this case, the reduction rate analysis section 309 acquires the determination result from the print layout section 306 in S1001.

Once determining the number of pages of the print data laid out and the area occupied by the print data on the final page as described above, the reduction rate analysis section 309 can calculate the reduction rate required to fit the print data into the predetermined number of pages as described above.

The CPU 201 then acquires the page width information of the structured document 303 from the page width information detecting section 310 (S1002), and judges whether the page width of the structured document 303 is fixed or variable based on the page width information (S1003). The process proceeds to S1004 if it is judged that the page width is fixed, or to S1008 if it is judged that the page width is variable.

First, the case that the page width is judged to be fixed will be described. The CPU 201 sets the reduction rate P as a variable and assigns the reduction ratio r in the height direction to the reduction rate P, to calculate the actual number of pages when the reduction rate P is applied to the structured document 303 (S1004).

With the above assigning processing, the print layout section 306 reduces the print data according to the reduction ratio r, to lay out the print data on pages having the size determined according to the print settings. The reduction rate analysis section 309 checks the number of pages of the print data laid out in this way in S1004.

The reason for the above processing is that, even if the reduction is made at the reduction ratio r calculated to lay out the print data in n−1 pages in S1001, the print data actually fails to fit into n−1 pages in some cases. For example, when a text or image object appears across pages, such an object may be relocated on the next page to prevent the object from being divided between the pages. In this case, even though the intermediate data is reduced at the reduction rate P and laid out, the entire of the object appearing across pages will be shifted to the next page. As a result, the number of pages may be n, not n−1.

To solve the above problem, the CPU 201 determines the number of sheets actually required for printing when the reduction rate P is applied, and determines whether the number of sheets is n−1 or not (S1005). The process proceeds to S1007 if the number of sheets is determined to be n−1, or to S1006 if the number of sheets is determined not to be n−1. If the number of sheets is determined not to be n−1, i.e., if it is n, the CPU 201 calculates a reduction ratio r2 required to fit the print data reduced at the reduction rate P into the number of sheets n−1. Using the calculated ratio as the new reduction rate P (S1006), the CPU 201 performs the processing of S1004 again. As described above, for a fixed page width, the CPU 201 repeats the processing steps S1004 to S1006 until the number of sheets becomes n−1, to obtain the reduction rate P with which the print data can fit into n−1 sheets. The CPU 201 confirms the reduction rate P with which the print data can fit into n−1 sheets (S1007), and then terminates this processing.

In S1003 again, if it is determined that the page width is variable, the process proceeds to S1008. The CPU 201 assigns $\sqrt{r}$ to the reduction rate P, to calculate the actual number of pages when the reduction rate P is applied to the structured document 303 (S1008). In S1008, as in S1004, the number of pages is calculated considering an event of relocating an object appearing across pages to the next page.

The CPU 201 determines the number of sheets actually required for printing when the reduction rate P is applied, and determines whether the number of sheets is n−1 or not (S1009). The process proceeds to S1011 if the number of sheets is determined to be n−1, or to S1010 if the number of sheets is determined not to be n−1. If the number of sheets is determined not to be n−1, i.e., if it is still n, the CPU 201 calculates a reduction ratio r3 required to fit the print data reduced at the reduction rate P into n−1 sheets. Using the calculated ratio as the new reduction rate P (S1010), the CPU 201 performs the processing of S1008 again. As described above, for a variable page width, the CPU 201 repeats the processing steps S1008 to S1010 until the number of sheets becomes n−1, to obtain the reduction rate P with which the print data can fit into n−1 sheets. The CPU 201 confirms the reduction rate P with which the print data can fit into n−1 sheets (S1011), and then terminates this processing.

Using the reduction rate determined by the reduction rate analysis section 309 as described above, the print layout section 306 lays out the intermediate data. In this way, the intermediate data laid out in n pages can be laid out to fit into n−1 pages with no blank space left in the height direction on the final page.

In this layout, the print layout section 306 simply reduces the length and width of the print data when the page width is fixed. When the page width is variable, however, it performs editing processing on the intermediate data, such as changing the return position of a text.

In S1001, whether the sheet orientation and the number of columns should be changed as shown in FIG. 6E may be judged. More specifically, in S1001, the reduction rate analysis section 309 acquires the size of the print data and the print settings for calculation of the page size from the print layout section 306 as described above. At this time, the reduction rate analysis section 309 compares the size of the print data in the page width direction to the width of the page, to calculate the blank space in the page width direction. When having judged that the sheet orientation and the number of columns should be changed as shown in FIG. 6E, the reduction rate analysis section 309 calculates a new page size according to the print settings, and determines the reduction rate so that the print data reduced at this rate can fit into the page size.

As described above, while r is used as the reduction rate in S1004, $\sqrt{r}$ is used as the reduction rate in S1008. The reason for this is that, as shown in FIGS. 9A and 9B, while the reduction rate of the print image is reflected as it is in the length direction of the print image when the page width of the structured document 303 is fixed, it is applied to both the width direction and the length direction of the print image when the page width is variable.

In this embodiment, the number of sheets required for printing is reduced stepwise by pressing the reduction button 505 repeatedly. Alternatively, it may be reduced at one time by specifying a given number of sheets. In this case, with no need to specify the number of sheets a plurality of times until a desired number of sheets is reached, the number of steps to be performed by the user can be further reduced.

As already described in relation to FIG. 6E, the reduction rate analysis section 309 determines the sheet orientation and the number of columns as required and calculates a new page size. This layout processing is especially effective when the structured document 303 having a fixed page width is reduced. When the page width is fixed as in the case shown in FIGS. 6A-6D, the higher the reduction rate, the larger the right-side blank portion becomes. By changing the sheet orientation and the layout, however, such a right-side blank portion can be eliminated, and also the number of sheets can be reduced, although the reduction rate is unchanged.

Another embodiment will be described, where print data is laid out at a specified reduction rate, and further laid out in a different sheet orientation in a different number of columns as required, to print the print data. The configuration of the system and the configuration of the PC in this embodiment are the same as those in FIGS. 1 and 2.

Figure 11:
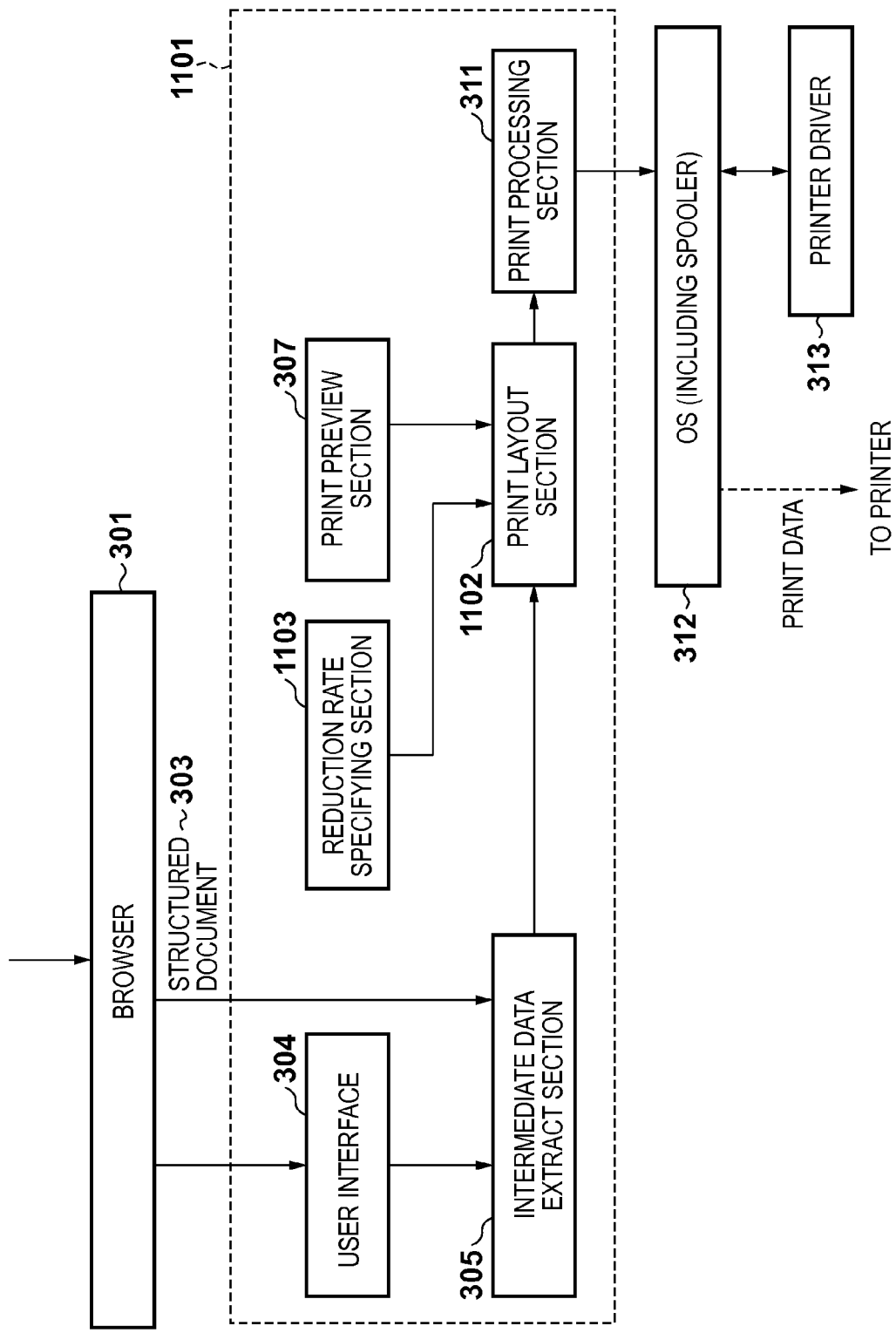
FIG. 11 is a block diagram showing a software configuration of the information processing apparatus.

FIG. 11 is a block diagram showing a software configuration of the PC 101 in this embodiment. A program operable on the PC 101 and the data processing configuration thereof will be described hereinafter with reference to FIG. 11. The browser 301 in FIG. 11 is the same as that described with reference to FIG. 3. A structured document print module 1101 in FIG. 11 is a plug-in software application called from the browser 301 using a structured document 303 as a parameter. The browser 301 executes the structured document print module 1101 when the user starts the browser 301. In the structured document print module 1101, the user interface 304 and the intermediate data extract section 305 are the same as those described with reference to FIG. 3.

A print layout section 1102, like the print layout section 306 in FIG. 3, lays out an intermediate data file extracted by the intermediate data extract section 305 to the sheet size according to the print settings. Also, when the reduction rate is specified by a reduction rate specifying section 1103 to be described later, the print layout section 1102 lays out the intermediate data reduced according to the specified reduction rate to the sheet size. At this time, the print layout section 1102 calculates the numbers of sheets required when the specified reduction rate is applied for a plurality of sheet orientations and layouts, and arranges the print data in the sheet orientation and in the number of pages in one sheet with which the number of sheets is smallest. At this time, the print layout section 1102 determines the sheet orientation and the number of pages in one sheet with which the number of sheets is smallest by calculating the blank space left when the print data is arranged according to the various types of layouts. The blank space can be calculated from the print settings (the sheet size, the size of the print area in the sheet size) and the size of the print data.

The print preview section 307 displays the intermediate data file laid out by the print layout section 1102 on the display section 206 as a print preview.

In this embodiment, the print preview screen 501 has the slider bar 504 with which the user can specify the reduction rate of the print data 502 displayed on the print preview screen 501 in units of 1%. The reduction rate specifying section 1103 detects the reduction rate specified by the user with the slider bar. The print processing section 311, the OS 312, and the printer driver 313 are the same as those described with reference to FIG. 3.

Figure 12B:
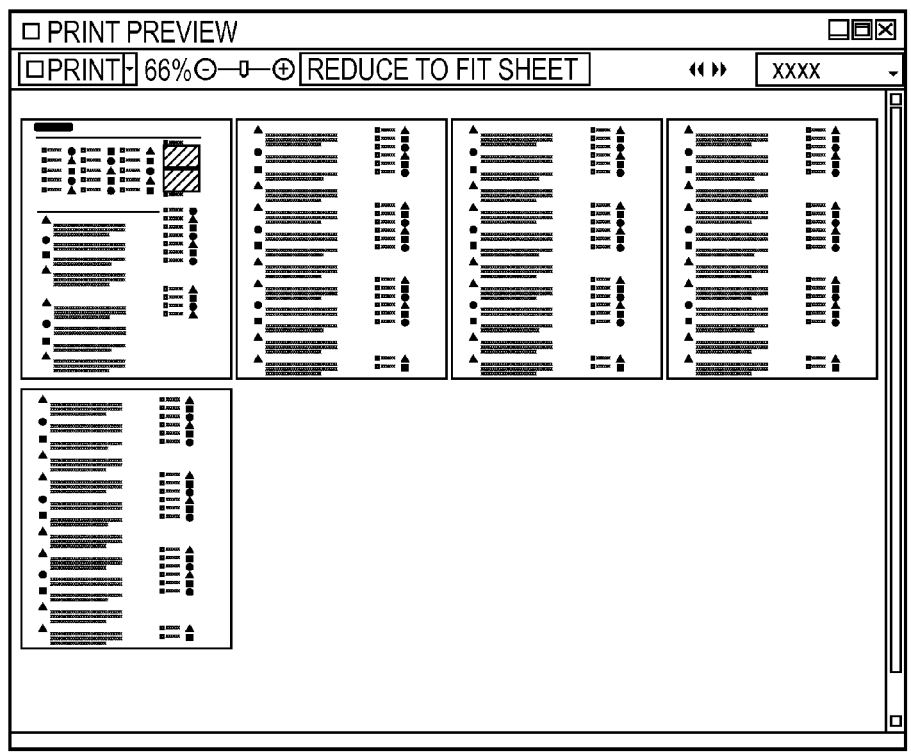

Next, the operation of the reduction rate specifying section 1103 and the print layout section 1102 in this embodiment will be described with reference to FIGS. 12A-12C. FIG. 12A shows a thumbnail display on the print preview screen 501. In FIG. 12A, eight sheets are shown on the print preview screen 501. FIG. 12B shows a print preview screen presented when a reduction rate of 66% is specified with the slider bar 504 in the state shown in FIG. 12A. In FIG. 12B, the print image is displayed in five sheets.

Figure 12C:
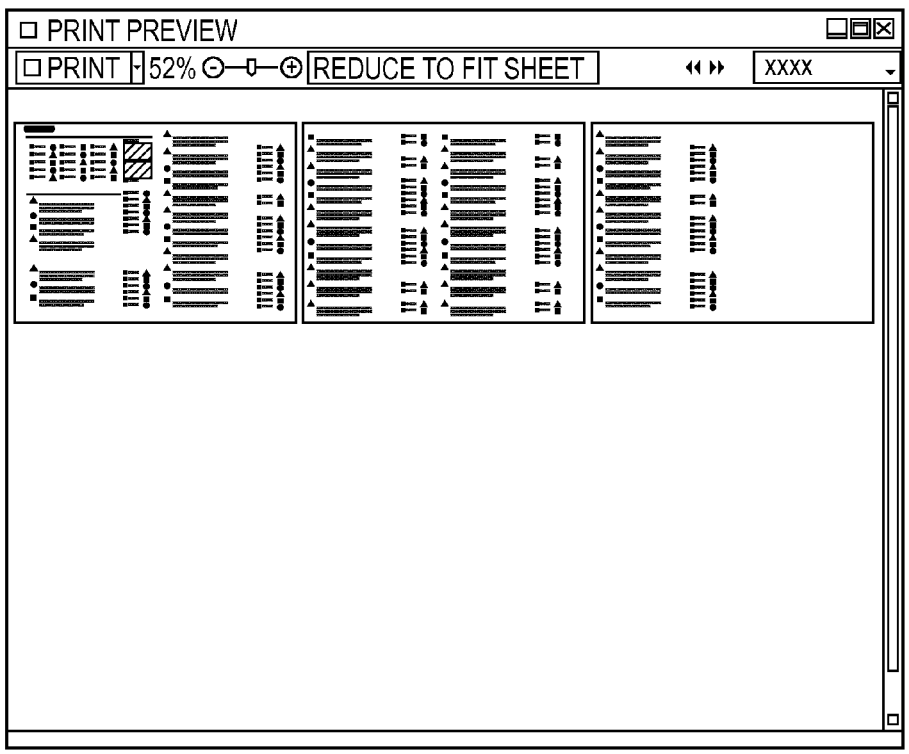

FIG. 12C shows a print preview screen presented when a reduction rate of 52% is further specified with the slider bar 504. In FIG. 12C, the sheets are rotated to landscape orientation, and then the layout is changed to a two-column layout, to display the print image in three sheets at the same reduction rate. Although the two-column layout in landscape orientation is shown as an example, the layout may be selected from layouts of a total of six different combinations of the sheet orientation, portrait or landscape, and the number of columns, one column, two columns, or three columns.

As described above, in this embodiment, when the reduction rate is specified with the slider bar 504, the reduction rate specifying section 1103 notifies the print layout section 1102 of the reduction rate. The print layout section 1102 selects, from a plurality of sheet orientations and layouts, the sheet orientation and the layout with which the number of sheets is smallest at the specified reduction rate, and displays the print preview of this layout.

In the embodiments described above, once the user gives an instruction for page increase/decrease, the number of pages is determined in response to the instruction, and the print data is laid out to fit into the determined number of pages. Thus, by giving an instruction so as to obtain a desired number of pages, the user can have the print data laid out to fit into the specified number of pages. In this way, the user can lay out the data based on the structured document appropriately and easily.

In the above embodiments, the user gives an instruction of increasing/decreasing the page from the number of pages of the print data currently arranged. Alternatively, the user may specify the number of pages before arrangement of the print data in pages, to arrange the print data to fit into the specified number of pages. Although the print data is reduced in the above embodiments, it may be enlarged when the number of pages is to be increased.

The present invention is not limited to the case of enlarging/reducing the print data when the print data is already arranged in pages, but the size of the print data may be determined so as to fit into the number of pages specified by the user at the time of preparation of the print data. In this case, by specifying the number of pages, the user can prepare print data according to the specified number of pages easily and appropriately.

Also, the present invention is not limited to the case of displaying a print preview of the print data having the number of pages specified by the user, but, in response to the specification of the number of pages by the user, the print data having the specified number of pages may be prepared, and the resultant print data may be printed without display of its print preview. Furthermore, the present invention is not limited to the case of preparing print data so as to fit into the number of pages specified by the user, but when the print data exceeds the number of pages specified by the user, the print data may be arranged to fall within the specified number of pages. In other words, by specifying the upper limit of the number of pages, the user can have the print data printed so as to fall within the upper-limit number of pages. In the above embodiments, printing of data laid out in pages was described as an example. The present invention is not limited to this, but displaying of data on a display device and various types of output processing such as storing data in memory may be performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-192032, filed Sep. 2, 2011, which is hereby incorporated by reference herein in its entirety.

What is claimed is:

1. An information processing apparatus comprising:
a decision unit configured to decide, based on an instruction from a user, a number of pages for laying out predetermined data, which includes text data and has been laid out in pages of a predetermined number;
a determination unit configured to determine whether a return position in a text, which corresponds to the text data in a page of the pages of the predetermined number, is able to be changed, by analyzing layout information of the predetermined data;
a specifying unit configured to specify a height of the text to fit the predetermined data to pages of the number of pages decided by the decision unit, and to specify a degree of change of a size of a character in the text, for changing a height of the text in a predetermined page to the specified height, in accordance with a determination by the determination unit,
wherein the specifying unit specifies different degrees of change of a size of a character in accordance with determinations that (i) the return position is able to be changed and (ii) the return position is not able to be changed, and the specifying unit specifies a same height of the text in each determination; and
a processing unit configured to process the predetermined data, so that the predetermined data fits to the specified height, by changing the size of the character in the text based on the degree of change specified by the specifying unit and by changing the return position of the text in a case where the determination unit determines that that return position is to be changed.

2. The information processing apparatus of claim 1, wherein, in a case where the determination unit determines that the return position in the text is not able to be changed, the processing unit executes variable magnification processing for the predetermined data according to the number of pages decided by the decision unit, so that the predetermined data fits to the specified height of each of the pages.

3. The information processing apparatus of claim 1, further comprising:
an acquisition unit configured to acquire a print setting used for printing the page or each of the pages,
wherein the processing unit process the predetermined data so that the predetermined data fits to the specified height of each of the pages having a page size designated by the print setting acquired by the acquisition unit.

4. An information processing method to be executed by an information processing apparatus, the method comprising the steps of:
deciding, based on an instruction from a user, a number of pages for laying out predetermined data, which includes text data and has been laid out in pages of a predetermined number;
determining whether a return position in a text, which corresponds to the text data in a page of the pages of the predetermined number, is able to be changed, by analyzing layout information of the predetermined data;
specifying a height of the text to fit the predetermined data to pages of the number of pages decided by the decision unit, and a degree of change of a size of a character in the text, for changing a height of the text in a predetermined page to the specified height, in accordance with a determination in the determining step,
wherein the specifying step specifies different degrees of change of a size of a character in accordance with determinations that (i) the return position is able to be changed and (ii) the return position is not able to be changed, and specifies the same height of the text in each determination; and
processing the predetermined data, so that the predetermined data fits to the specified height, by changing the size of the character in the text based on the specified degree of change specified in the specifying step and by changing the return position of the text in a case where the determining step determines that the return position is to be changed.

5. A non-transitory computer-readable storage medium for storing a program, the program causing a computer to execute a method comprising the steps of:
deciding, based on an instruction from a user, a number of pages for laying out predetermined data, which includes text data and has been laid out in pages of a predetermined number;
determining whether a return position in a text, which corresponds to the text data in a page of the pages of the predetermined number, is able to be changed, by analyzing layout information of the predetermined data;
specifying a height of the text to fit the predetermined data to pages of the number of pages decided by the decision unit, and a degree of change of a size of a character in the text, for changing a height of the text in a predetermined page to the specified height, in accordance with a determination in the determining step,
wherein the specifying step specifies different degrees of change of a size of a character in accordance with determinations that (i) the return position is able to be changed and (ii) the return position is not able to be changed, and specifies the same height of the text in each determination; and
processing the predetermined data, so that the predetermined data fits to the specified height, by changing the size of the character in the text cased on the specified degree of change specified in the specifying step and by changing the return position of the text in a case where the determining step determines that the return position is to be changed.

6. The information processing apparatus of claim 1, wherein the decision unit decides the number of pages, in accordance with the instruction by the user input in a state where the predetermined data which has been laid out in the pages of the predetermined number, is displayed by a display apparatus.

7. The information processing apparatus of claim 1, wherein the processing unit processes the predetermined data by further changing at least one of a number of columns or a direction of a page.

8. The information processing apparatus of claim 1, further comprising a print control unit configured to cause a print apparatus to print the predetermined data which is processed by the processing unit and laid out in the pages of the number of pages decided by the decision unit, on a printing medium.

9. The information processing apparatus of claim 1, further comprising a display control unit configured to cause a display apparatus to display the predetermined data which is processed by the processing unit and laid out in the pages of the number of pages decided by the decision unit.

10. The information processing apparatus of claim 1, wherein the predetermined data is a structured document for displaying a web page, and the determination unit determines whether the return position in the text included in the structured document is able to be changed in accordance with a page width of the web page.

11. The information processing apparatus of claim 10, wherein the predetermined data is intermediate data corresponding to the structured document for displaying the web page, and the layout information indicates the structured document or a CSS file.

12. The storage medium of claim 5, wherein the predetermined data is data corresponding to a structured document for displaying a web page, and
wherein the program is a plug-in program for a web browser which can display the web page.

13. The information processing apparatus of claim 1, wherein the predetermined data further includes image data corresponding to an image.

14. The information processing method of claim 4, wherein, in a case where the determining step determines that the return position in the text is not able to be changed, the processing step executes variable magnification processing for the predetermined data according to the number of pages decided by the decision step, so that the predetermined data fits to the specified height of each of the pages.

15. The information processing method of claim 4, further comprising the step of:
acquiring a print setting used for printing the page or each of the pages,
wherein the processing step processes the predetermined data, so that the predetermined data fits to the specified height of each of the pages having a page size designated by the print setting acquired by the acquiring step.

16. The information processing method of claim 4, wherein the decision step decides the number of pages, in accordance with the instruction by the user input in a state where the predetermined data which has been laid out in the pages of the predetermined number, is displayed by a display apparatus.

17. The information processing method of claim 4, wherein the processing step processes the predetermined data by further changing at least one of a number of columns or a direction of a page.

18. The information processing method of claim 4, further comprising a print control step of causing a print apparatus to print the predetermined data which is processed by the processing step and laid out in the pages of the number of pages decided in the deciding step, on a printing medium.

19. The information processing method of claim 4, further comprising the step of displaying the predetermined data which is processed by the processing step and laid out the pages of the number of pages decided in the deciding step.

20. The information processing method of claim 4, wherein the predetermined data is a structured document for displaying a web page, and the determination step determines whether the return position in the text included in the structured document is able to be changed in accordance with a page width of the web page.

21. The information processing method of claim 4, wherein the predetermined data is intermediate data corresponding to the structured document for displaying the web page, and the layout information indicates the structured document or a CSS file.

22. The information processing method of claim 4, wherein the predetermined data further includes image data corresponding to an image.

* * * * *